United States Patent
Miyauchi

Patent Number: 6,054,998
Date of Patent: Apr. 25, 2000

[54] DOCUMENT DISPLAY SYSTEM FOR DISPLAYING DOCUMENTS SET IN FONTS NOT NATIVE TO A DISPLAY DEVICE

[75] Inventor: Koji Miyauchi, Kawasaki, Japan

[73] Assignee: Hewlett-Packard Company, Palo Alto, Calif.

[21] Appl. No.: 08/968,962

[22] Filed: Nov. 12, 1997

[30] Foreign Application Priority Data

Nov. 11, 1996 [JP] Japan .................................. 8-314238

[51] Int. Cl.$^7$ .................................................. G06T 11/00
[52] U.S. Cl. .......................................... 345/467; 382/259
[58] Field of Search ................................... 345/467, 468, 345/469; 382/259

[56] References Cited

U.S. PATENT DOCUMENTS

| | | | |
|---|---|---|---|
| 5,468,077 | 11/1995 | Motokado et al. ...................... | 345/468 |
| 5,481,277 | 1/1996 | Morinaga ................................. | 345/143 |
| 5,567,061 | 10/1996 | Nagata .................................... | 345/467 |
| 5,577,177 | 11/1996 | Collins et al. ........................... | 345/469 |
| 5,664,086 | 9/1997 | Brock et al. ............................. | 345/468 |
| 5,727,140 | 3/1998 | Ohtomo et al. .......................... | 345/467 |
| 5,949,435 | 9/1999 | Brock et al. ............................. | 345/468 |
| 5,959,635 | 9/1999 | Watanabe et al. ....................... | 345/469 |

FOREIGN PATENT DOCUMENTS 2-23871  2/1990  Japan .

OTHER PUBLICATIONS

Adobe Systems Incorporated, "Adobe Type 1 Font Format", Addison–Wesley Publishing Company, 1990, ISBN0–2–1–570440–0, Chapters 1 and 6.

Adobe Systems Incorporated, "PostScript Language Reference Manual (second edition)", Addison–Wesley Publishing Company, 1990, ISBN0–201–18127–4, pp. 278–282.

Adobe Systems Incorporated, "Type Font Format Supplement", May 1994, Technical Specification #5015, pp. 8–26.

Apple Computer, Inc., The True Type Font Format Specification Version 1.0., 1990 R0601LL/A, pp. 1–39.

Karow, Peter, "Digital Typefaces", Springer Verlag, 1994, ISBN:0–340–56509–4, pp. 57–185.

Karow, Peter, "Font Technology", Springer Verlag, 1994, ISBN:0–340–57223–6, pp. 105–133.

*Primary Examiner*—Mark R. Powell
*Assistant Examiner*—Chanté Harrison
*Attorney, Agent, or Firm*—Ian Hardcastle

[57] ABSTRACT

The document display system comprises a first character shape generator, a first display and a first transmitter in a first terminal device; and a first receiver, a second character shape generator and a second display in a second terminal device. The first character shape generator generates the character shapes of characters constituting at least part of a document. The character shapes are generated in response to skeleton information and in response to shape generation information that includes information representing a typeface. The first display displays the characters with the character shapes generated by the first character shape generator so that the at least part of the document is displayed set in the typeface. The first transmitter transmits character information indicating the skeleton information for each of the characters. The first receiver receives skeleton information for each of the characters. The second character shape generator generates character shapes for the characters for which the first receiver receives the skeleton information. The character shapes are generated in response to the received skeleton information and in response to shape generation information. The second display displays the character shapes generated by the second character shape generator so that the at least part of the document is displayed set in the typeface.

11 Claims, 5 Drawing Sheets

DOCUMENT DISPLAY SYSTEM FOR DISPLAYING DOCUMENTS SET IN FONTS NOT NATIVE TO A DISPLAY DEVICE

FIELD OF THE INVENTION

The present invention relates to a document display system that rapidly displays documents set in fonts not native to a display device that forms part of the system. The system requires that relatively few data be transferred to the display device to enable the document to be displayed in the non-native fonts.

BACKGROUND OF THE INVENTION

At least one type of font for displaying letters, numbers, or symbols (characters) corresponding to every language description desired by a user is required for document display using a computer. Usually, the characters to be displayed are specified by character codes, such as the ASCII or ANSI character codes. Thus to display the letter A, a code of 65, the ASCII code for the letter A, is sent to the display. The appearance of the displayed characters depends on the font in which the characters is displayed. Multiple fonts exist and can be used in a document. The word font as used in this disclosure is a character set unified by typeface and size. Typefaces such as Courier and Helvetica exist for the Roman alphabet used in the English language. These typefaces may be available in a variety of point sizes, such as 8pt., 10pt., 12pt, etc. Typefaces such as Mincho and Gothic exist for the Japanese language.

While mainframe computers or medium-sized computers such as desktop computers are usually provided with a broad selection of different fonts. However, memory size limitations in small-sized computers, such as portable computers, mean that only a few fonts can be provided. This is especially problematical in computers that operate in languages such as Japanese or Chinese in which the character set expressed in each font is composed of a very large number of characters. In such languages, a single font can occupy most of the available memory.

When a set of document data representing a document is transferred between computers, for example, between computers connected to a network, the number of data transferred is reduced by limiting the document data to the character codes of the characters constituting the document. However, since information about the fonts of the character is excluded from the document data, the document as displayed on the terminal that receives the document data (the receiving apparatus) will usually look different from the document as displayed on the terminal that transmitted the document data (the sending apparatus).

The problem just described can be eliminated by including font information in the document data. However, if the receiving apparatus is to display the document in the same fonts as those used to display the document on the sending apparatus, the receiving apparatus must be provided with a large memory to store a large variety of fonts. Small computers, such as portable computers, may lack the memory capacity for this.

In addition, there may be a chance that a document created on the sending apparatus includes special characters not normally used by the user of the receiving apparatus. For example, the document created on the sending apparatus may include characters of a language that is foreign to the user of the receiving apparatus. For example, the French character ç, the German character ä and the Spanish character ñ do not exist in the ASCII character set. In this case, the user of the receiving apparatus cannot completely display the document or can only display parts of the document unless the font or fonts provided in the receiving apparatus include the special characters. Naturally, a document can be completely reproduced by increasing the character set represented in each font, but this requires additional memory. Providing additional memory to store rarely-used special characters can be regarded as in inefficient use of such additional memory.

Instead of transferring document data composed of character codes between the computers connected to a network, the document can be transferred as a set of bitmaps, one bitmap for each character of the document. In this case, however, the number of data required to represent the document is much greater than the number of data required to represent the document using character codes. Therefore, when transferring documents as bitmaps, the transfer takes a long time and the user experiences a long delay between the start of the document transfer and the time when the document is finally displayed on the receiving apparatus. Moreover, the document transfer can consume a considerable fraction of the transmission bandwidth of the network, which slows other network traffic. Editing the document at the receiving apparatus is difficult because the characters that have been converted into bitmaps require character recognition software to convert the bitmaps back to character codes. Such software is complex and may be subject to recognition errors.

What is needed is a document display system capable of displaying a document in a receiving apparatus in the same font as that in which the document was displayed in the sending apparatus even if the fonts for displaying the characters forming the document are not provided at the receiving apparatus.

What is also needed is a document display system in which a document can be displayed on a receiving apparatus at high speed with a small amount of data transfer and that can display special characters without significantly reducing the display speed or increasing the amount of data transfer.

SUMMARY OF THE INVENTION

The invention provides a document display system that comprises a first character shape generator, a first display and a first transmitter in a first terminal device; and a first receiver, a second character shape generator and a second display in a second terminal device. The first character shape generator generates the character shapes of characters constituting at least part of a document. The character shapes are generated in response to skeleton information and in response to shape generation information that includes information representing a typeface. The first display displays the characters with the character shapes generated by the first character shape generator so that the at least part of the document is displayed set in the typeface. The first transmitter transmits character information indicating the skeleton information for each of the characters.

The first receiver receives skeleton information for each of the characters. The second character shape generator generates character shapes for the characters for which the first receiver receives the skeleton information. The character shapes are generated in response to the received skeleton information and in response to shape generation information. The second display displays the character shapes generated by the second character shape generator so that the at least part of the document is displayed set in the typeface.

The second character shape generator may include a memory in which predetermined shape generation information is stored and the shape generation information in response to which the second character shape generator generates the character shapes may include the predetermined shape generation information.

The character information transmitted by the first transmitter may include shape generation information, the receiver may additionally receive the shape generation information transmitted by the first transmitter, and the second character shape generator may generate the character shapes in response to the shape generation information received by the first receiver.

Each of the characters may include a character element having a skeleton defined by skeleton points, and the skeleton information may includes position information and connection information. The position information indicates the position of each of the skeleton points, and the connection information indicates how ones of the skeleton points are interconnected when the number of skeleton points defining the skeleton exceeds two.

Each of the characters may include a character element having a skeleton and the shape generation information may include information defining the shape to be applied to the skeleton of the character element.

The system may additionally comprise a network interconnecting the first transmitter and the first receiver.

DETAILED DESCRIPTION OF THE INVENTION

In the document display system according to the present invention, the receiving apparatus connected to the network includes a shape generating engine that generates character shapes in response to skeleton information and shape generation information. The character shape may be the shape of one entire character or may be the shape of an element of the character. Normally, to create the shape of an entire character, the shape of the character is built from the shapes of a number of character elements. The shape of each character element is generated in response to skeleton information and shape generation information for the character element.

In the above representation of characters, each character element can be regarded as being composed of a skeleton and a shape. The skeleton defines the topology of the character element. For example the skeleton of the letter "l" may be defined by two skeleton points, one vertically above the other. Shape defines the appearance of the character element. For example, the letter "l" in the font Times New Roman and the letter "l" in the font Arial have the same skeletons but have different shapes, the former having a more complex shape than the latter. The skeleton information of each character element is composed of position information. The position information indicates the position of each skeleton point defining the skeleton of the character element. Generally, two or more skeleton points are required to define the skeleton of a character element, but one skeleton point may suffice. The skeleton of the period (.) may be defined with one skeleton point, for example. The skeleton points are determined according to the skeleton of the character element.

If the skeleton of the character element is defined by two or more skeleton points, the skeleton points are located at the ends of the skeleton, at connections between the skeletons of connecting character elements, at points at which the skeleton bends, or at points that define a curvature of the skeleton. The character skeleton, i.e., the skeleton of the entire character, is determined taking into consideration the ends, connections, bending points and curves. The position information of the character skeleton is determined by projecting the character onto a two-dimensional coordinate system, as will be described in more detail below.

If the character skeleton is defined by two or more skeleton points, additional information that defines the lines connecting specific groups of skeleton points can be included. This connecting line information may be related to the character skeleton of the entire character or may be related to the skeleton of each character element. The information indicates which skeleton point can be connected to which other skeleton point or which skeleton component can be created to create the character skeleton. Supplemental information may also be included in the skeleton information. Such information can indicate that a specific pair of skeleton points is connected by a straight line or is connected by curved line of a certain curvature, for example.

The shape generation information is information related to generating the shapes that will be applied to the various skeletons. This information can indicate the shape in the neighborhood of the skeleton points of the character and the width of the character element that extends between the skeleton points. For example, the information can indicate the shape of the skeleton component ends.

More information on how characters are represented using shape information and skeleton information and how characters represented by shape information and skeleton information can be displayed can found in a United States patent application entitled *Apparatus and Method for Generating Fonts from Very Small Data Sets*. The inventor of this patent application is Yoichi Manome, it was filed on the same day as this application and was assigned to the same assignee. The entire disclosure of Manome's patent application is incorporated into this disclosure by reference.

The receiving apparatus can receive through the network from the sending apparatus as the character information for each character forming the document (a) the skeleton information and the shape generation information, or (b) only the skeleton information.

When the skeleton information and the shape generation information are received, the character shape generating engine generates the shape of each character in response to the skeleton information and the shape generation information received with the skeleton information. When only the skeleton information is received, the character shape generating engine generates the character shape in response to the received skeleton information and additionally in response to predetermined shape generation information stored in the receiving apparatus.

Consequently, the receiving apparatus can create the shape of each character forming the document and can edit the displayed document even when the received document is set in a font that does not exist in the receiving apparatus itself.

Compared to receiving data defining the font itself considerably fewer data are transferred to the receiving apparatus when the characters are represented as just described. The reduced number of data subject to transmission enables the document to be displayed as it its received. The delay time between the start of document transfer to document display is extremely short. Moreover, the number of data transferred represents a small fraction of the transmission bandwidth of the network, so the transfer does not slow other network traffic.

Furthermore, since a variety of fonts does not have to be stored in the receiving apparatus, the size of the memory in the receiving apparatus is not dictated by the need to store a large number of fonts. In addition, the character shape generating engine only generates the shape of the character. Consequently, the hardware and software needed in the receiving apparatus to provide the character shape generating engine can be relatively simple.

The character information may or may not include a code for each character forming the document.

If the character information includes the code for each character forming the document, the memory of the receiving apparatus can store the character shapes generated for previously-received characters linked to the respective character codes. This allows newly-received characters to be displayed with already generated character shapes if the character has been received previously.

The document display system according to the present invention stores character information for various fonts in the host device or the font server connected to the network. The character information includes skeleton information and shape generation information for each character in the character set rendered in the font. If the document received from the sending apparatus is created from fonts not available on the receiving apparatus, the receiving apparatus can demand the above-mentioned character information for the fonts it requires from the host device or the font server. The receiving apparatus can then display the document by creating the character shapes using the procedure described above.

Figure 1:
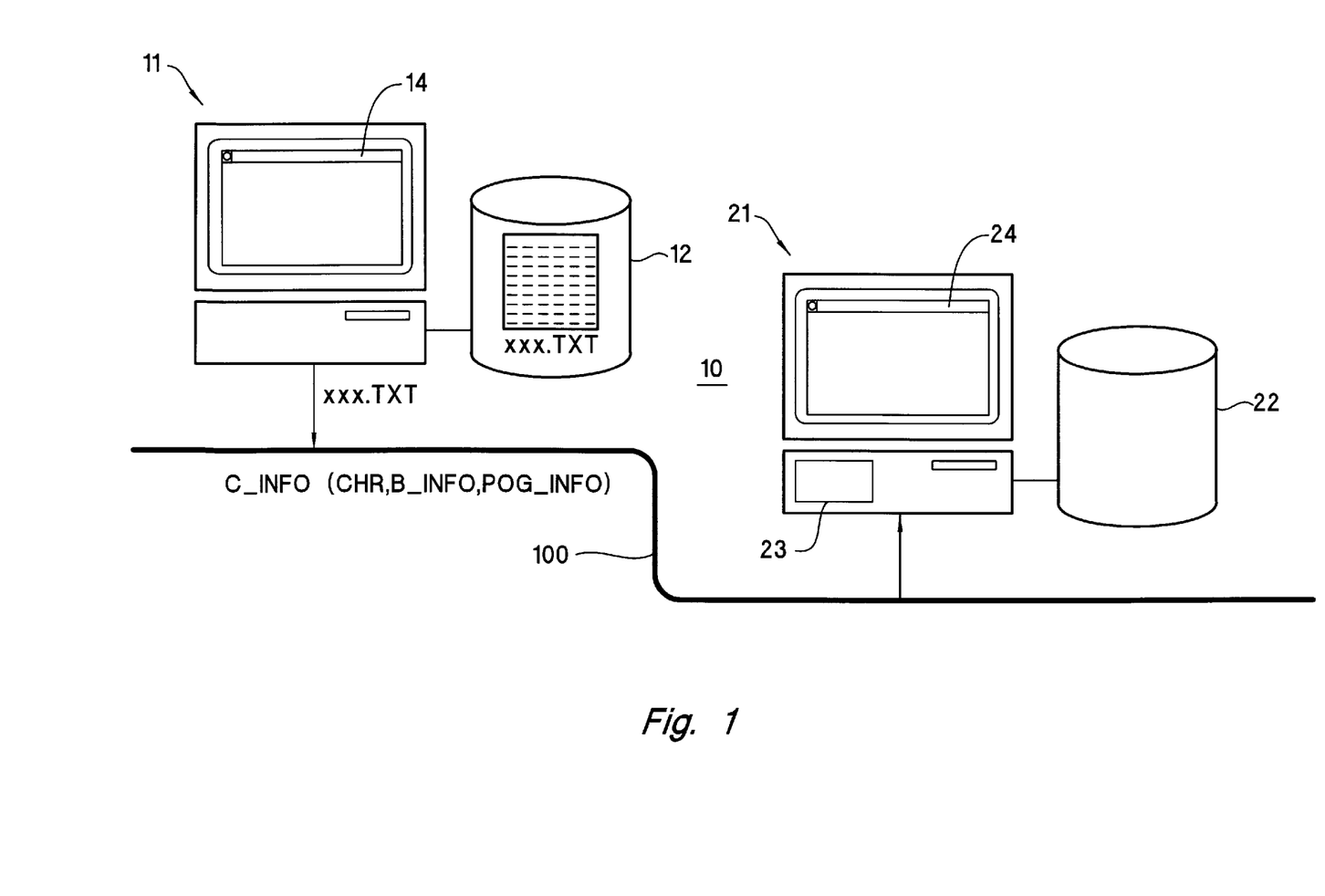
FIG. 1 is a schematic diagram of a first embodiment of the document display system according to the invention.

FIG. 1 is a schematic diagram showing a first embodiment of a document display system 10 according to the invention. In FIG. 1, the sending apparatus 11 and the receiving apparatus 21 are connected to the network 100. In the first embodiment, the Mincho typeface for the Japanese language is stored in the sending apparatus 11, but the receiving apparatus 21 lacks this typeface. In this example, the receiving apparatus 21 receives document data from the sending apparatus 11 through the network 100 and displays the document in the Mincho typeface.

The document data are stored in the memory 12 of the sending apparatus 11 as a file with a file name of the form xxx.TXT. The xxx.TXT file contains a character code CHR for each character of the document, and the character information C_INFO. The character information is composed of skeleton information B_INFO corresponding to each character code CHR and shape generation information POG_INFO corresponding to each character element. The sending apparatus includes the master display 14. The master display displays the characters indicated by the character codes CHR in the form specified by the skeleton information B_INFO and shape generation information POG_INFO. The document set in the Mincho typeface and stored in the xxx.TXT file was displayed using the master display 14 when it was originally created.

The character shape generating engine 23 resides in the receiving apparatus 21. The receiving apparatus also includes the slave display 24. As will be described below, the character shape generating engine can reproduce each character in the xxx.TXT document in the original form in which it was displayed by the master display 14. The character shape generating engine reproduces each character in its original form in response to the skeleton information B_INFO and the shape generation information POG_INFO corresponding to the character code CHR of the character.

The receiving apparatus 21 receives the character code CHR, the skeleton information B_INFO, and shape generation information POG_INFO for each character in the xxx.TXT file from the sending apparatus 11 through the network 100. The receiving apparatus uses the character shape generating engine 23 to reproduce each character in its original form. The slave display 24 displays the document using the reproduced character forms.

Figure 3:
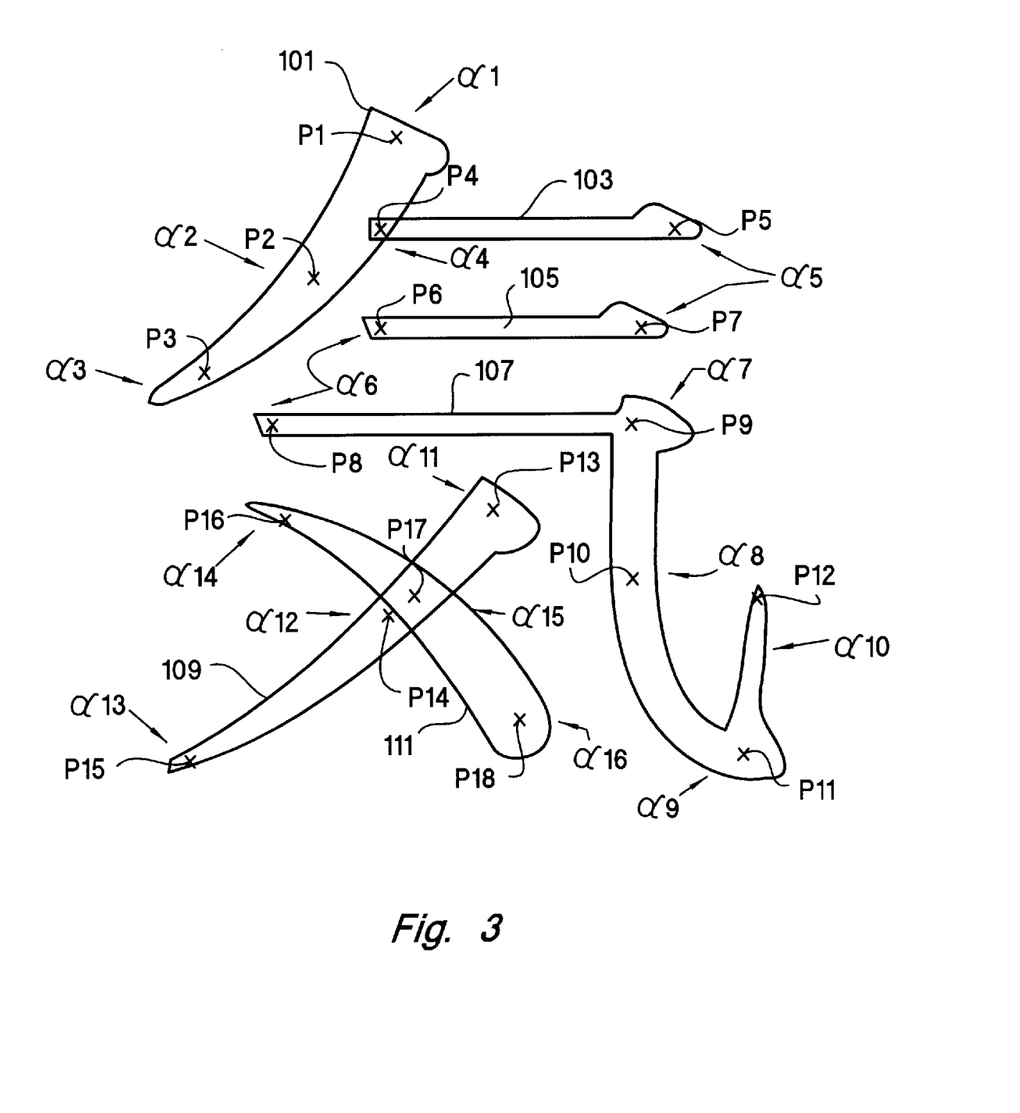
FIG. 3 shows the state of each partial shape positioned at the skeleton points based on the shape generation information for the kanji character "KI" and connects these partial shapes with each skeleton component as a unit.

An example of how the receiving apparatus 21 displays the kanji character "KI" specified by the Japanese Industrial Standard (JIS) character code CHR 6A48 will now be described in detail. The complete character 100 is shown in FIG. 3. The character is composed of seven character elements 101, 103, 105, 107, 109 and 111 in the order in which the character would be written by hand.

Figure 2A:
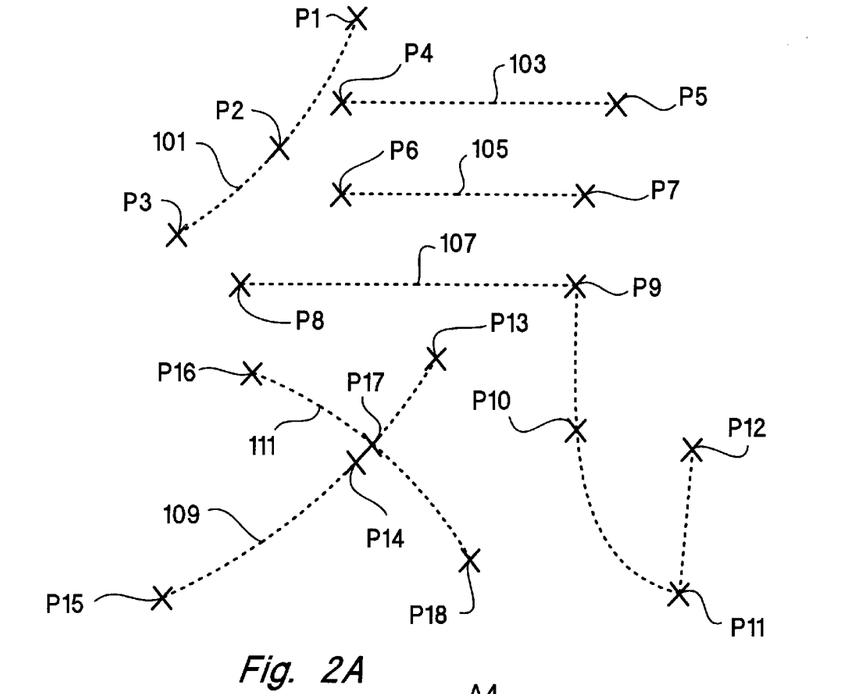
FIG. 2A shows the skeleton points of the skeleton information for the Japanese kanji character "KI."

FIG. 2A shows the skeleton points P1 to P18 of the character "KI." Each skeleton point is indicated by an "×." Each skeleton point is part of the skeleton information B_INFO and takes the form of a pair of coordinates $(X_i, Y_i)$, where i=1, 2, . . . , 18. The skeleton point information B_INFO also includes connecting line information. In this example, the connecting line information indicates the skeletons of the character elements of the character "KI." The skeletons of the character elements 101, 103, 105, 107, 109 and 111 are indicated by (P1, P2, P3), (P4, P5), (P6, P7), (P8, P9, P10, P11, P12), (P13, P14, P15), and (P16, P17, P18), respectively. Usually, several skeleton points define the skeleton of a character element such as a horizontal line, a vertical line, a wipe, a splash, etc. In some characters, some of the skeletons that form the skeleton character are formed by interconnecting lower-level skeletons. The skeleton of the character "KI" is formed based on the connecting line information and the coordinates of the skeleton points $(X_i, Y_i)$.

The shape generation information POG_INFO includes partial shape generation information that defines the shape of the character elements near the skeleton points P1 to P18.

The skeleton points and the partial shape generation information $\alpha 1$ to $\alpha 6$ for the character "KI" have the following correspondences shown in FIG. 3:
P1:α1, P2:α2, P3:α3, P4:α4, P5:α5, P6:α6, P7:α5, P8:α6, P9:α7, P10:α8, P11:α9, P12:α10, P13:α11, P14:α12, P15:α13, P16:α14, P17:α15, P18:α16.

The skeleton information B_INFO and the shape generation information POG_INFO for the character "KI" are described in the groups written below.
10 α1, α2, α3: P1, P2, P3
20 α4, α5: P4, P5
30 α6, α5: P6, P7

40 α6, α7, α8, α9, α10: P8, P9, P10, P11, P12
50 α11, α12: P13, P14
60 α13, α14: P15, P16.

In addition to the local shape information and the skeleton point information, the character information C_INFO includes additional information such as bold and italics. In the first embodiment, such additional information is not included in the character information C_INFO to simplify the explanation.

The character shape generating engine 23 uses the character information C_INFO, i.e., the skeleton information B_INFO and the shape generation information POG_INFO, and displays the character "KI" by executing the contents of lines 10, 20, 30, 40, 50 and 60 set forth above. The character shape generating engine 23 reproduces the shape of the character in units of the skeletons of the character elements in response to the partial shape generation information assigned to each skeleton.

Figure 2B:
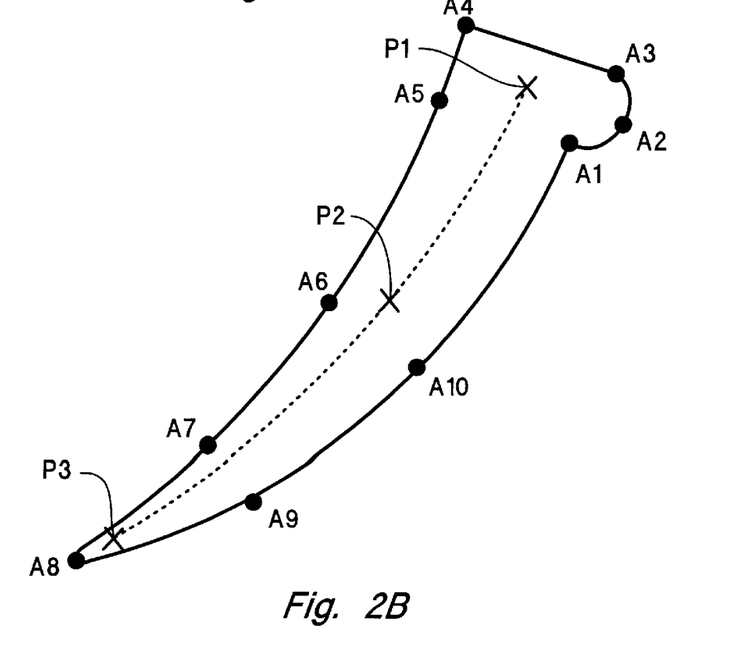
FIG. 2B shows how the shape of a portion of the kanji character "KI" is generated.

The description of the character element 101 set forth in line 10, which is repeated below for convenience, will now be described with reference to FIG. 2B. 10 α1, α2, α3: p1, p2, p3

In line 10, al includes the coordinate point information A1, A2, A3, A4, and A5 that defines the shape of the character element near the skeleton point P1, α2 includes the coordinate point information A6 and A10 that defines the shape of the character element near the skeleton point P2, and α3 includes the coordinate point information A7, A8, and A9 that defines the shape of the character element near the skeleton point P3. By executing line 10, the shape for the skeleton located by P1, P2, and P3 are formed in the order of A1→A2 . . . A10→A1.

The character shape generating engine 23 executing lines 20, 30, 40, 50 and 60 respectively defines the shapes of the character elements 103, 105, 107, 109 and 111 of the character "KI."

A character shape is reproduced by the character shape generating engine 23 after the receiving apparatus 21 has received the file xxx.TXT from the sending apparatus 11. And also, the character shape generating engine 23 reproduces one after another the above-mentioned character shapes for the characters whose skeleton information B_INFO and shape generation information POG_INFO are received.

In the first embodiment, the receiving apparatus 21 receives the character codes CHR and their corresponding skeleton information B_INFO and shape generation information POG_INFO from the sending apparatus 11. Therefore, after the character shape generating engine 23 has generated the character shape of each character whose character information has been received by the receiving apparatus, the receiving apparatus can store the resulting character shape in the memory 22 linked to the respective character code CHR. Then, when the receiving apparatus receives a character code corresponding to a character shape it has stored, it can simply retrieve the character shape from the memory 22. The character shape generating engine does not have to reproduce such characters again.

In the above examples, the characters are displayed on the slave display 24 in the Mincho typeface. However, the characters can alternatively be displayed in the Gothic typeface. In this case, the skeleton information B_INFO of each character is common to both the Mincho and Gothic typefaces. Only the shape generation information POG_INFO is different for the two typefaces. This arrangement significantly decreases the number of data required to transfer the document. There are many kinds of Mincho typefaces, but only the shape generation information need be changed to set the document in a different kind of Mincho typeface from the one shown in this embodiment. There is no need to change the skeleton information .

Figure 4:
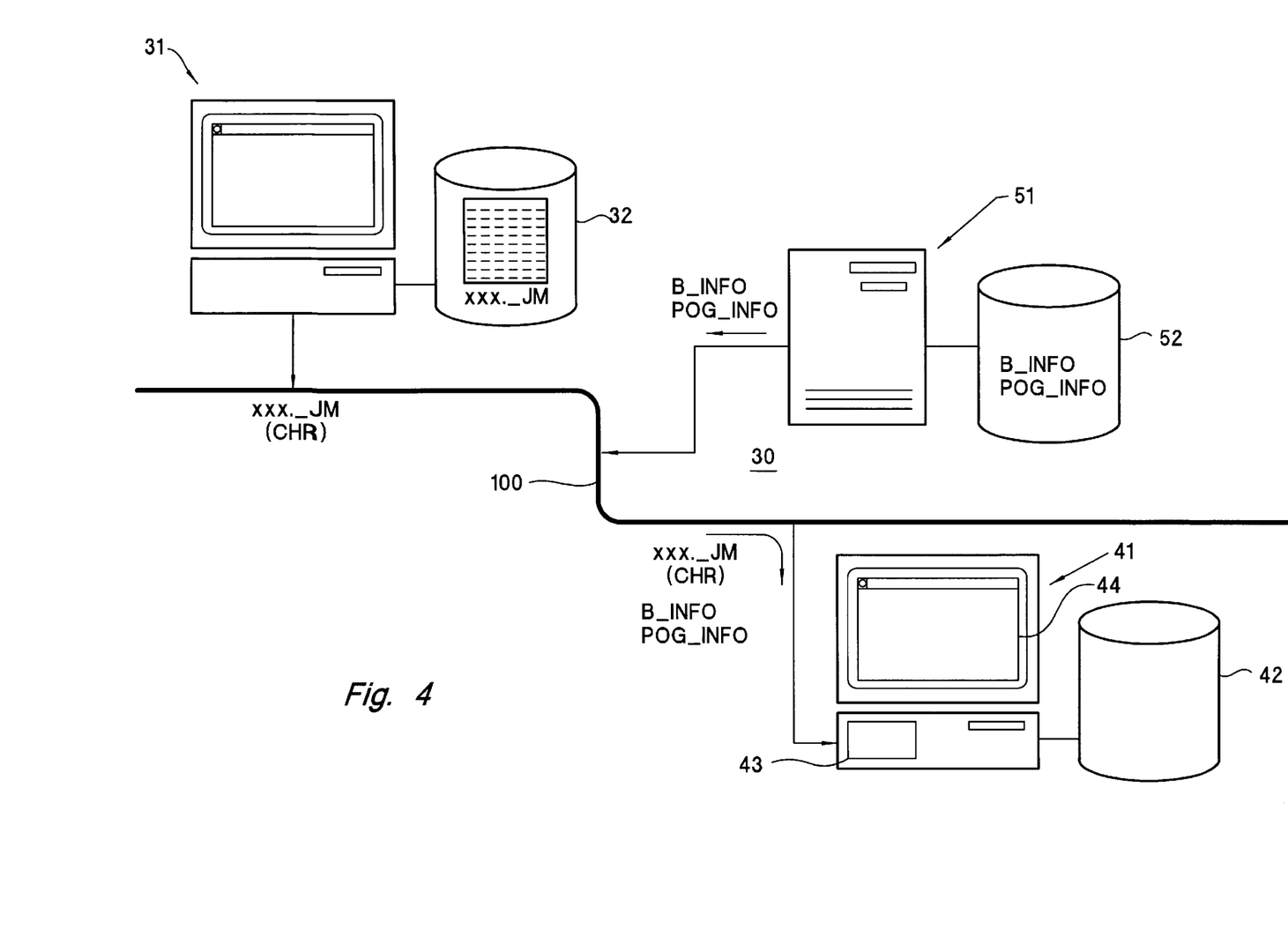
FIG. 4 is a schematic diagram of a second embodiment of the document display system according to the invention.

FIG. 4 shows a second embodiment 30 of a document display system according to the invention. In this, the sending apparatus 31, the receiving apparatus 41 equipped with the character shape generating engine 43, and the font server 51 are connected to the network 100. In the example shown in FIG. 4, a document created set in a Japanese font in the sending apparatus 31 is displayed on the receiving apparatus 41 that does not have Japanese fonts.

The sending apparatus 31 creates a file having a filename of the form xxx._JM and stores this document in the memory 32. This file contains character codes CHR only. Skeleton information B_INFO and the shape generation information POG_INFO are not included. The skeleton information B_INFO and the shape generation information POG_NFO are stored in the memory 52 of the font server 51. The xxx._JM file additionally includes identification information that indicates that the document is written in Japanese and is set in the Mincho font.

When the receiving apparatus 41 receives the xxx._JM file from the sending apparatus 31, the receiving apparatus additionally demands and receives the skeleton information B_INFO and the shape generation information POG_INFO required to display the document in the Japanese Mincho font from the memory 52 of the font server 51.

Similar to the first embodiment, the character shape generating engine 43 of the receiving apparatus 41 generates the character shapes from the skeleton information B INFO and the shape generation information POG_INFO and displays them on the slave display 44. Again, the receiving apparatus can store in the memory 42 the shapes of the characters reproduced by character shape generating engine 43 linked to the respective character code to save the character shape generating engine from having to generate the character shape again when the character code is later received.

Figure 5:
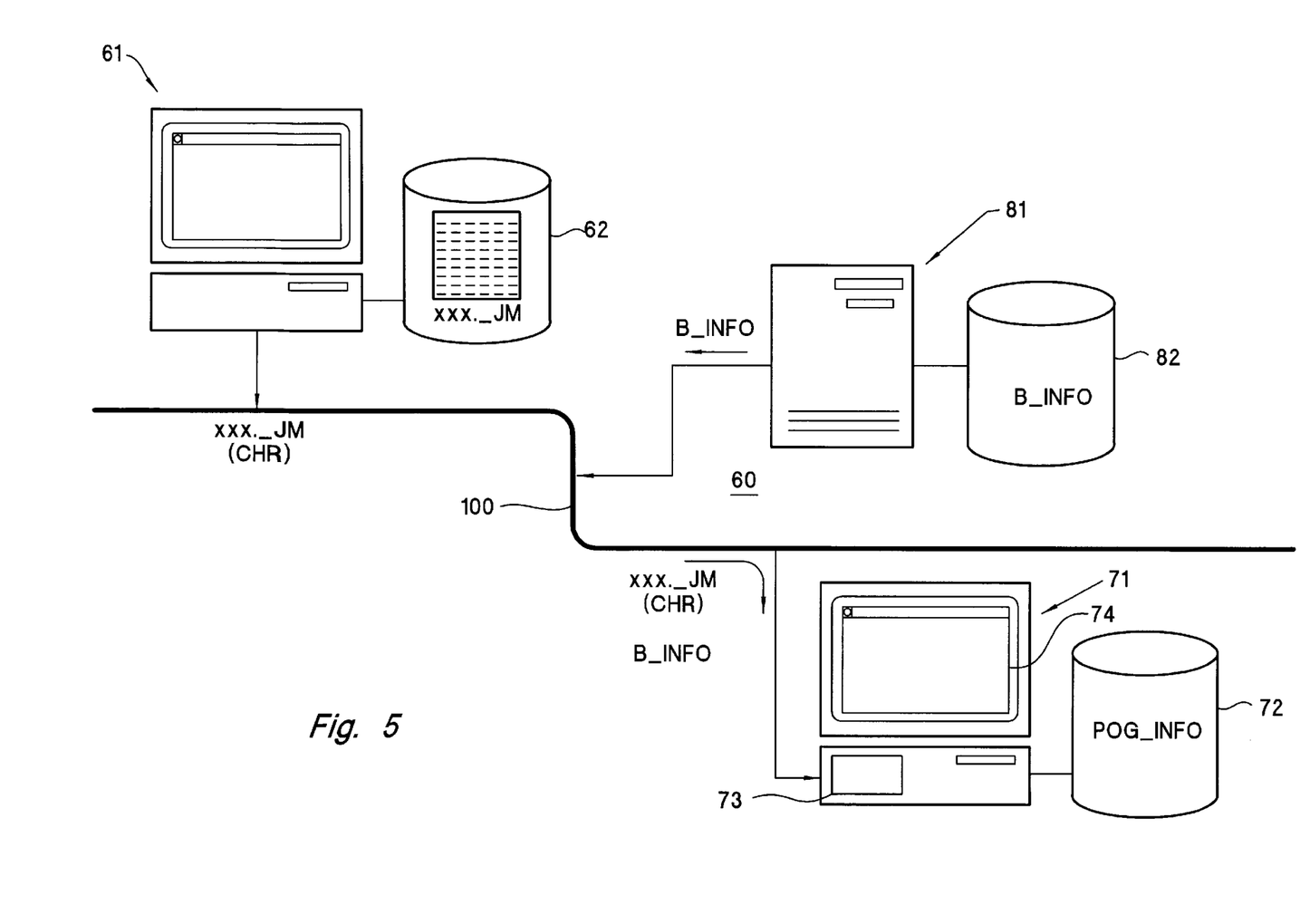
FIG. 5 is a schematic diagram of a third embodiment of the document display system according to the invention.

FIG. 5 shows the third embodiment 60 of a document display system according to the invention. The sending apparatus 61, the receiving apparatus 71 equipped with the character shape generating engine 73, and the font server 81 are connected to the network 100. In the example shown in FIG. 5, a document set in a Japanese font in the sending apparatus 61 is displayed by the receiving apparatus 71 that does not have a Japanese font.

The sending apparatus 61 creates a file having a filename of the form xxx._JM and stores this document in the memory 62. This file contains character codes CHR only. Skeleton information B_INFO and the shape generation information POG_INFO are not included. As in the second embodiment, the document includes the identification information that indicates that the document is written in Japanese and is set in the Mincho font.

Skeleton information B_INFO corresponding to the character codes CHR is stored in the memory 82 of the font server 81. Shape generation information POG_INFO is stored in the memory 72 of the receiving apparatus 71. The receiving apparatus 71 can assign correspondences between character codes CHR the skeleton points of the respective character skeleton, and shape generation information POG_INFO defining many partial shapes.

When the receiving apparatus 71 receives the xxx._JM file from the sending apparatus 61, the receiving apparatus 71 additionally demands and receives the skeleton information B_INFO for the Japanese Mincho font from the memory 82 of the font server 81.

Similar to the first embodiment, the character shape generating engine 73 of the receiving apparatus 71 reproduces character shapes in response to the skeleton information B_INFO received from the font server 81 and the shape generation information POG_INFO stored in the receiving apparatus 71 and relating to partial shapes corresponding to the skeleton points of the character skeleton and displays the character shapes on the slave display 74. As in the first embodiment, the character shape generating engine 73 of the receiving apparatus 71 does not have to generate new character shapes for characters that have previously been received.

The document display system according to the invention enables a document to be displayed set in its original font at high speed and with the transfer of relatively few data even if the receiving apparatus does not have the fonts used in the document. The invention also enables a document to be displayed at high speed and with the transfer of relatively few data even if the document includes characters not normally used by the user of the receiving apparatus.

Although the invention has been described with reference to computers interconnected via a network, the invention is equally advantageous when a document is transferred from one computer to another by means of a detachable storage medium such as a floppy disk.

Although this disclosure describes illustrative embodiments of the invention detail, it is to be understood that the invention is not limited to the precise embodiments described, and that various modifications may be practiced within the scope of the invention defined by the appended claims.

I claim:

1. A document display system, comprising: in a first display device:

a first character shape generator that generates character shapes of characters constituting at least part of a document, the character shapes being generated in response to skeleton information and in response to shape generation information that includes information representing a typeface, a first display that displays the characters with the character shapes generated by the first character shape generator so that the at least part of the document is displayed set in the typeface, and a first transmitter that transmits character information indicating the skeleton information for each of the characters; and in a second display device:

a first receiver that receives skeleton information for each of the characters, a second character shape generator that generates character shapes for the characters for which the first receiver receives the skeleton information, the character shapes being generated in response to the received skeleton information and in response to shape generation information, and a second display that displays the character shapes generated by the second character shape generator so that the at least part of the document is displayed set in the typeface.

2. The document display system of claim 1, in which:

the second character shape generator includes a memory in which predetermined shape generation information is stored; and the shape generation information in response to which the second character shape generator generates the character shapes includes the predetermined shape generation information.

3. The document display system of claim 1, in which the character information transmitted by the first transmitter includes shape generation information;

the receiver additionally receives the shape generation information transmitted by the first transmitter; and the second character shape generator generates the character shapes in response to the shape generation information received by the first receiver.

4. The document display system of claim 1, in which:

the character information sent by the first transmitter includes a character code for each of the characters constituting the at least part of the document; and the first receiver is additionally for receiving the character codes.

5. The document display system of claim 1, in which:

the system additionally comprises, in a third terminal:

a character information memory in which shape generation information for each of the characters constituting the at least part of the document is stored, a second receiver that receives the character information transmitted by the first transmitter, and a second transmitter that transmits shape generation information read from the character information memory in response to the character information received by the second receiver; and the first receiver is additionally for receiving the shape generation information transmitted by the second transmitter; and the second character shape generator generates the character shapes in response to the shape generation information received by the first receiver.

6. The document display system of claim 5, in which:

the character information memory additionally stores skeleton information for each character constituting the at least part of the document; and the second transmitter additionally transmits skeleton information read from the character information memory in response to the character information.

7. The document display system of claim 6, in which the character information is composed of a character code for each character.

8. The document display system of claim 1, 2, 3, 4, 5 or 6, in which:

each of the characters includes a character element having a skeleton defined by skeleton points; and the skeleton information includes:

position information indicating a position each of the skeleton points, and connection information indicating how ones of the skeleton points are interconnected when a number of skeleton points defining the skeleton exceeds two.

9. The document display system of claim 1, 2, 3, 4, 5 or 6, in which:

each of the characters includes a character element having a skeleton;

the shape generation information includes information defining a shape to be applied to the skeleton of the character element.

10. The document display system of claim 1, additionally comprising a network interconnecting the first transmitter and the first receiver.

11. The document display system of claim 1, in which:

the first transmitter includes means for recording a removable storage medium; and the first receiver includes means for reading from the removable storage medium.

* * * * *